Patented Jan. 28, 1936

2,028,763

UNITED STATES PATENT OFFICE 2,028,763

METHOD OF TREATING ORGANIC ESTERS OF CELLULOSE

Camille Dreyfus, New York, N. Y., and George Schneider, Montclair, N. J., assignors to Celanese Corporation of America, a corporation of Delaware No Drawing. Application February 9, 1932, Serial No. 591,930

3 Claims. (Cl. 260—102)

This invention relates to the treatment of cellulose acetate or other organic esters of cellulose and relates more particularly to the stabilization or purification of the same.

An object of our invention is to treat cellulose acetate or other organic esters of cellulose in a simple manner in order to purify or stabilize the same. A further object of our invention is to treat organic esters of cellulose with aqueous liquids at temperatures above 100° C. but preferably not substantially exceeding 125° C., whereby they are purified and stabilized to a degree heretofore not attainable. Other objects of this invention will appear from the following detailed description.

In the making of cellulose acetate, generally cellulose is treated with an acetylating agent such as acetic anhydride in the presence of sulfuric acid or other sulfur bearing compound as catalyst. During the acetylation there may also be present solvents such as acetic acid or diluents. The cellulose acetate thus formed may or may not be subjected to an after treatment known as "ripening" to develop the desired solubility characteristics, and is then precipitated and/or washed carefully. Despite the careful washing, the resultant cellulose acetate contains quite an appreciable amount of sulfur, probably in the form of a sulpho-cellulosic compound. For many purposes, the presence of sulfur compounds is objectionable, as it tends to render the cellulose acetate unstable even at ordinary temperatures, the cellulose acetate containing appreciable amounts of sulfur tends for instance to become brittle after a period of time and has other characteristics that are objectionable for some purposes. Such cellulose acetate has a low degree of stability as is shown by the fact that when the same is heated with water, a great amount of acidity is developed.

We have found that if cellulose acetate formed in the presence of a sulfur bearing catalyst or other catalyst is subjected to water or aqueous liquid which is at a temperature above the normal boiling point of water (100° C.), but not substantially above 125° C. for a suitable period of time, appreciable amounts and even all of the sulfur is removed therefrom, while the stability and resistance to decomposition of the cellulose acetate is greatly increased. This result is surprising since if the cellulose acetate is treated with water at or below 100° C., even for a prolonged period of time, it cannot be purified to the degree attainable by our process.

In accordance with our invention we purify, stabilize or remove sulfur compounds from cellulose acetate or other organic esters of cellulose by treating the same with water or aqueous liquids at temperatures above 100° C. but not substantially above 125° C. for a suitable period of time.

While this invention is applicable to the treatment of organic esters of cellulose in general, such as cellulose formate, cellulose acetate, cellulose propionate, cellulose butyrate, it is of particular importance in connection with the treatment of cellulose acetate, and therefore will be described more particularly in connection with the treatment of cellulose acetate.

The cellulose acetate to be treated may have previously been prepared by the action of acetic anhydride or other acetylating agent in the presence of a sulfur bearing catalyst such as sulfuric acid, sulfur chloride, sodium acid sulfate, dimethyl sulfate, chlorsulfonic acid, etc. However the treatment of cellulose acetate prepared in the presence of other catalysts such as zinc chloride or phosphoric acid is not excluded. The acetylation may be conducted in any manner such as in the presence of acetic acid or other solvent for the cellulose acetate that is formed, or in the presence of a non-solvent diluent, such as benzol, toluol, isopropyl ether, carbon tetrachloride, etc., wherein the cellulose acetate does not dissolve. The cellulose acetate may be subjected to a hydrolysis or ripening treatment to develop desired solubility characteristics, or the cellulose acetate may be precipitated directly from the acetylating bath without such ripening process. This invention is of general application to the treatment of cellulose acetate in solid form irrespective of how made or of its previous treatments, although generally it is preferable to wash the cellulose acetate with water to free it as much as possible from the reagents employed during the acetylation.

The cellulose acetate or other organic ester of cellulose, in accordance with our invention, is treated with water or aqueous liquid at temperatures above 100° C. but not appreciably above 125° C., say at temperatures of 104° to 120° C. In order to attain these temperatures, various expedients may be conveniently employed. For instance the treatment may be carried out in closed chambers, vessels, containers, passages, pipes, coils and the like, which are heated, or into which steam under superatmospheric pressure or other heated gas or vapor is introduced, and superatmospheric pressures corresponding to the vapor pressure of the water or aqueous liquid at the desired temperature is imposed thereon by means of pressure release valves or standpipes of sufficient height connected to said chambers or passages. In the case of water, the required pressures are on the order of 2 to 20 pounds per square inch above atmospheric pressure.

If instead of employing water alone to treat the cellulose acetate or other organic ester of cellulose, there are employed aqueous solutions of inorganic or organic salts, or solutions of water with high boiling liquids such as glycerine and the like, which solutions are sufficiently concentrated so that the boiling point of the same is at least as high as the desired temperature of treatment, no superatmospheric pressure need be applied, and the treatment may be applied in open vessels if desired.

In order to facilitate or increase the degree of purification or stabilization of the cellulose acetate or other organic ester of cellulose, the aqueous treating liquid preferably contains a small amount of acid, such as sulfuric acid, hydrochloric acid or other mineral acid, say in amounts of 0.01 to 0.1% concentration.

The amount of water or aqueous liquid employed may be from 5 to 50 or more times the weight of the cellulose acetate being treated, and the time of treatment may vary from 1 to 10 hours or more, say 2 to 5 hours, depending on the nature of the cellulose acetate and the results desired.

By use of temperatures of treatment above 100° C. but below 125° C. many advantages are obtained. If pressure is employed to attain these temperatures, the amount of pressure required is relatively small being merely from 2 to 20 pounds per square inch above atmospheric, and therefore expensive pressure apparatus need not be employed, since simple apparatus, in fact even vessels made of wooden staves, can readily withstand such pressures. Moreover these temperatures can be attained by heating aqueous solutions of salts or of high boiling liquids at ordinary atmospheric pressures.

A great advantage of the use of temperatures of treatment of above 100° C., but below 125° C. is that, whereas treatment at these temperatures produce a degree of purification or stabilization not attainable by treatment at or below 100° C., the color of the cellulose acetate treated by the present process is not impaired and indeed may be improved, while if the cellulose acetate is treated with aqueous liquids at higher temperatures and pressures, it darkens appreciably. If desired, the cellulose acetate may be bleached with chlorine or a hypochlorite before or after being subjected to the treatment with the hot aqueous liquid in order further to improve its color.

Cellulose acetate which has been formed in the presence of sulfuric acid as catalyst may be prepared in accordance with our invention which has a sulfur content equivalent to less than 0.03% $H_2SO_4$. We have prepared cellulose acetate which has substantially no sulfur, and some which have less than 0.02% and also less than 0.01% (measured as $H_2SO_4$). The cellulose acetate treated by this invention has great stability as is shown by the fact that when it is heated with water for a substantial period of time little or no acidity is developed. Because of the treatment described, cellulose acetate prepared by our invention has great stability as shown by the fact that it can be heated without becoming discolored or decomposed, to a higher temperature than in the case of former cellulose acetate.

The products so obtained are extremely valuable for use in the preparation of filaments, yarns, artificial straw, bristles, lacquers, films, celluloid articles and all other articles for which cellulose esters are used. Solutions of our cellulose acetate may be cast on nickel or other metallic surfaces for the making of films and the like, without the danger of corrosion of such surfaces. This is an important factor, since solutions of cellulose acetate of relatively high sulfur content tend to corrode nickel surfaces quite severely.

In order further to illustrate our invention, but without being limited thereto, the following specific example is given.

*Example*

A cellulose acetate is prepared by the acetylation of cotton linters or other cellulose by means of an acetylating mixture comprising acetic anhydride, acetic acid and sulfuric acid as catalyst, the cellulose acetate is then ripened or hydrolyzed until it is soluble in acetone and then precipitated by addition of water to the solution of cellulose acetate in the acetylating mixture. This cellulose acetate is heated under pressure with acidulated hard water containing about 0.03% of sulfuric acid, the pressure being 5 to 10 pounds per square inch and the temperature being 108 to 115° C. The time of treatment is about 3 hours. The cellulose acetate is then washed several times with water.

The cellulose acetate treated in this manner contains an amount of sulfur compound equivalent to less than 0.01% measured as sulfuric acid. This treated cellulose acetate when treated with water for a given period of time develops an amount of free acid that is only 10% of that developed by the untreated cellulose acetate under like treatment. When heated, the cellulose acetate treated in this manner chars and decomposes at a temperature that is at least 50° higher than the temperature at which the untreated cellulose acetate chars or decomposes.

It is to be understood that the foregoing detailed description is given merely by way of illustration and many variations may be made therein without departing from the spirit of our invention.

Having described our invention, what we desire to secure by Letters Patent is:

1. Method of purifying cellulose acetate prepared in the presence of sulfuric acid as catalyst, comprising heating the cellulose acetate in solid form with water containing from .01 to .1% of mineral acid at 108 to 115° C. at a pressure of 5 to 10 pounds per square inch above atmospheric.

2. Method of purifying cellulose acetate prepared in the presence of sulfuric acid as catalyst, comprising heating the cellulose acetate in solid form with water containing from .01 to .1% of sulfuric acid at 108 to 115° C. at a pressure of 5 to 10 pounds per square inch above atmospheric.

3. Method of purifying cellulose acetate prepared in the presence of sulfuric acid as catalyst, comprising heating the cellulose acetate in solid form with water containing 0.03% of sulfuric acid at 108 to 115° C. at a pressure of 5 to 10 pounds per square inch above atmospheric for substantially three hours.

CAMILLE DREYFUS.
GEORGE SCHNEIDER.